United States Patent
Humpenoeder et al.

(10) Patent No.: US 12,377,780 B2
(45) Date of Patent: Aug. 5, 2025

(54) DECORATIVE COMPOSITE MATERIAL WITH THREE-DIMENSIONAL STRUCTURES ARRANGED IN RECESSED REGIONS

(71) Applicant: MERCEDES-BENZ GROUP AG, Stuttgart (DE)

(72) Inventors: Jens Humpenoeder, Ulm (DE); Harald Tattko, Gaertringen (DE); Peter Schmitz, Aidlingen (DE); Bernd-Uwe Kettemann, Renningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/725,856

(22) PCT Filed: Nov. 28, 2022

(86) PCT No.: PCT/EP2022/083524
§ 371 (c)(1),
(2) Date: Jul. 1, 2024

(87) PCT Pub. No.: WO2023/126113
PCT Pub. Date: Jul. 6, 2023

(65) Prior Publication Data
US 2025/0074301 A1    Mar. 6, 2025

(30) Foreign Application Priority Data
Jan. 3, 2022    (DE) ..................... 10 2022 000 034.2

(51) Int. Cl.
*B60Q 3/60*    (2017.01)
*B32B 3/30*    (2006.01)
(Continued)

(52) U.S. Cl.
CPC ............. *B60Q 3/60* (2017.02); *B32B 3/30* (2013.01); *B32B 15/04* (2013.01); *F21V 3/00* (2013.01);
(Continued)

(58) Field of Classification Search
CPC ....... B32B 3/30; B32B 15/04; B32B 2451/00; F21V 3/00
See application file for complete search history.

(56) References Cited

U.S. PATENT DOCUMENTS

2004/0219366 A1 * 11/2004 Johnson ................ B32B 27/365
428/480
2004/0234771 A1 * 11/2004 Meyer .................. B29C 51/261
264/553
(Continued)

FOREIGN PATENT DOCUMENTS

DE    102020104078 A1    8/2021
DE    102021003476 A1 *  8/2021    ......... B29C 45/1418
(Continued)

OTHER PUBLICATIONS

Humpenoeder, Method for producing an exterior cladding element for a motor vehicle and an exterior cladding element, 2021, https://worldwide.espacenet.com/patent/search/family/077176402/publication/DE102021003476A1?q=pn%3DDE102021003476A1 (Year: 2021).*
(Continued)

*Primary Examiner* — Tracie Y Green
*Assistant Examiner* — Michael Chiang
(74) *Attorney, Agent, or Firm* — PATENT PORTFOLIO BUILDERS PLLC

(57) ABSTRACT

A decorative composite material includes a flat translucent decorative material with a visible side and a rear side opposite the visible side and a light-impermeable layer arranged on the rear side and having recessed regions.
(Continued)

Three-dimensional structures are arranged in the recessed regions on the rear side of the decorative material. A chrome foil spanning the recessed regions is arranged on the light-impermeable layer. The chrome foil has a translucent PVD layer and a diffuser layer facing away from the decorative material.

14 Claims, 1 Drawing Sheet

(51) Int. Cl.
  *B32B 15/04*    (2006.01)
  *F21V 3/00*     (2015.01)
  *F21W 106/00*   (2018.01)

(52) U.S. Cl.
  CPC ..... *B32B 2255/06* (2013.01); *B32B 2307/414* (2013.01); *B32B 2451/00* (2013.01); *B32B 2605/00* (2013.01); *F21W 2106/00* (2018.01)

(56) References Cited

U.S. PATENT DOCUMENTS

| | | | |
|---|---|---|---|
| 2019/0001880 A1* | 1/2019 | Schneider | G02B 6/006 |
| 2019/0283667 A1* | 9/2019 | Eitel | B60Q 3/64 |
| 2023/0398929 A1* | 12/2023 | Haraguchi | B60J 3/0217 |

FOREIGN PATENT DOCUMENTS

| | | |
|---|---|---|
| WO | 2018082856 A1 | 5/2018 |
| WO | 2020168324 A2 | 8/2020 |

OTHER PUBLICATIONS

International Search Report and Written Opinion mailed Mar. 15, 2023 in related/corresponding International Application No. PCT/EP2022/083524.

* cited by examiner

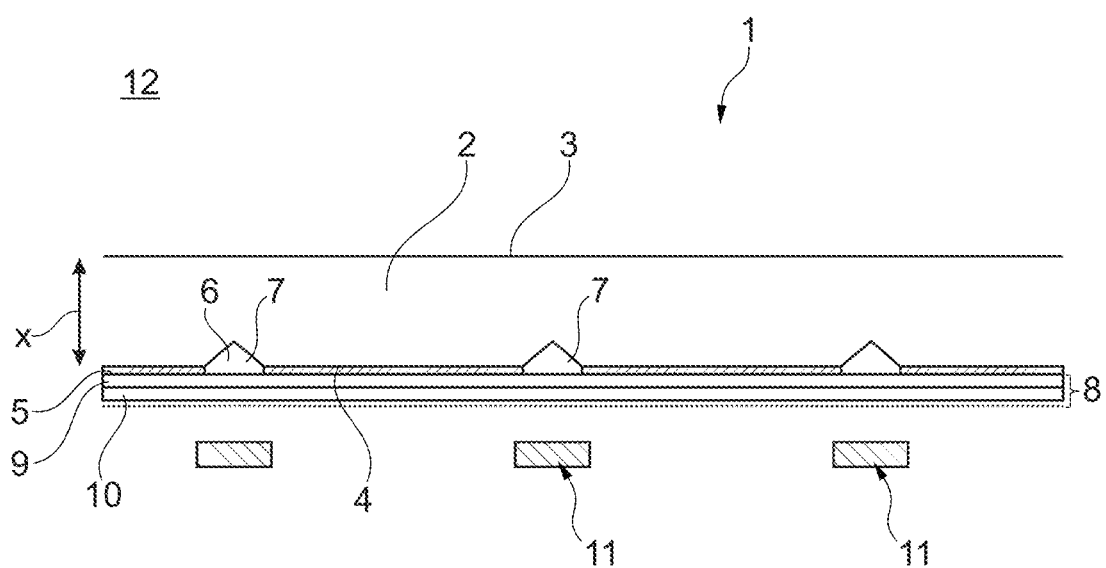

DECORATIVE COMPOSITE MATERIAL WITH THREE-DIMENSIONAL STRUCTURES ARRANGED IN RECESSED REGIONS

BACKGROUND AND SUMMARY OF THE INVENTION

Exemplary embodiments of the present invention relate to a decorative composite material having a flat translucent decorative material with a visible side and a rear side opposite the visible side, as well as to a motor vehicle having such a decorative composite material illuminated by means of a lighting device.

A generic decorative composite material, in particular for interior fittings of a motor vehicle, is known from DE 10 2020 104 078 A1, comprising a flat decorative material, which is translucent and has both a visible side and a rear side opposite the visible side. A printable diffuser is arranged on the rear side of this decorative material, wherein an at least substantially light-impermeable layer is applied, for example is printed, in a sub-region onto the side of the diffuser facing away from the decorative material. The regions recessed by the light-impermeable layer can represent information, patterns, or symbols that stand out particularly visually if the decorative composite material is backlit with a lighting device and in the process some of the light of the lighting device passes through the recessed regions to the visible side of the decorative material.

In order to make backlit three-dimensional structures, in particular, appear visually, for example in the case of so-called star panels with three-dimensional ornaments (stars), the desired color of the star panel can first be applied to a flat rear side of the decorative material composite by means of lacquering with subsequent free lasering or a partial transfer lacquer film. The chrome look of the 3D ornaments (stars) is then applied in a subsequent PVD process. Such a PVD process represents a process carried out under a vacuum and in most cases also at temperatures between 150° C. and 500° C. In a physical vapor deposition, a vacuum-based thin coating can be created. Such a PVD process (physical vapor deposition) is however comparatively expensive. The applied PVD layer must then still be protected from environmental factors by means of other layers, i.e., for example, covered.

Naturally, there are also other possibilities for the design color, for example by over-molding a foil in the same color as the car body, which has a partial chrome look in the region of the ornament. However, in order to be able to display the three-dimensional ornaments exactly, this foil must be shaped extremely precisely, i.e., in the present case deep-drawn, which is extremely difficult and therefore also complex and expensive, especially for larger components such as star panels, due to the exact forming shaping in the tenth of a millimeter range.

Exemplary embodiments of the present invention are directed to the problem of specifying an improved or at least an alternative embodiment for a decorative composite material of the generic type, which is both visually appealing as well as being cost-effective to manufacture.

The present invention is based on the general idea of replacing the previously required process of exact shaping of the chrome foil by merely spanning the recessed areas forming the three-dimensional ornaments in a comparatively simple and cost-effective manner. The decorative composite material according to the invention has a flat translucent decorative material with a visible side and a rear side opposite the visible side. A light-impermeable layer with recessed regions is arranged on the rear side. According to the invention, three-dimensional structures are now arranged in these recessed regions on the rear side of the decorative material or deformed into the decorative material. Additionally, a chrome foil, which merely spans the recessed regions and is at most thermally formed into them, if necessary, is arranged on the light-impermeable layer. An exact shaping, as was required until now, however is no longer necessary. The chrome foil is thus constructed like a sandwich and has a translucent PVD layer and a diffuser layer facing away from the decorative material and can be backlit for optically highlighting the three-dimensional ornaments, for example stars.

With the decorative composite material according to the invention, a visually extremely appealing chrome look of the 3D ornaments can thus be achieved simply by attaching the chrome foil directly onto the flat rear side of the decorative material, for example by gluing it on. Bonding, i.e., surface contacting, thus takes place exclusively in the regions of the decorative material that are not recessed. The notched three-dimensional structures (stars) are thus merely spanned by the chrome foil and are not exactly reshaped, but still have a glossy chrome look on the decorative composite material front side, i.e., on the visible side of the decorative material. However, it is not necessary to shape the chrome foil using a high-precision process, such as an HPF process, for the spanning; simple thermoforming, for example, is sufficient, if required at all. Due to the multi-layer structure of the chrome foil, it also has the diffuser layer for a backlighting system. This can be achieved, for example, by the foil itself not consisting of a transparent thermoplastic type of the plastics PC (polychloride), PMMA (polymethyl methacrylate) or PA12 (polyamide), but of an opaque or translucent variation of one of these plastics. Furthermore, the rear side and/or the front side of the chrome foil can also be applied with an additional diffuser layer in the screen-printing method. Therefore, it is possible to omit an additional diffuser pane behind the star panel, i.e., in the present case behind the decorative material, which would result in the overall system being built up further in the thickness direction of the decorative composite material.

In summary, the decorative composite material according to the invention makes it possible to avoid a subsequent and expensive PVD process that was previously necessary, as well as the time-consuming and high-precision shaping of the chrome foil. Furthermore, the multi-layer chrome foil now used, which merely spans the recessed areas, can also be used as a diffuser layer for a backlighting concept, thereby achieving a space-optimized overall concept for an illuminable star panel with homogeneously lit stars. Overall, this makes it possible to create an extremely visually appealing yet cost-effective and easy-to-produce decorative composite material.

Expediently, the diffuser layer is applied by means of screen printing. Screen printing methods today are common, cost-effective, and long-time proven methods for applying different layers, wherein the chrome foil can be produced cost-effectively.

Expediently, the three-dimensional structures (ornaments, stars) protrude into the decorative material. In general, the three-dimensional structures are cavities that cause a particularly high three-dimensionality and thus a visually extremely appealing impression.

Expediently, the light-impermeable layer is formed as a paint film. Therefore, it is possible to design the paint film in a car body color, wherein a particularly uniform and thus visually appealing impression can be created on a motor vehicle. Naturally, it is also conceivable to make the light-impermeable layer different to the car body color.

In a further advantageous embodiment of the decorative composite material according to the invention, the chrome foil is deformed by means of thermoforming into the three-dimensional structures in the recessed regions. As a result, the chrome foil can also be deformed in a three-dimensional manner, resulting in a particularly appealing overall visual impression. The three-dimensionally deformed chrome foil can also be used to create a highly effective three-dimensional image.

The present invention is further based on the general idea of equipping a motor vehicle with a decorative composite material that is illuminated, in particular backlit, by means of a lighting device, corresponding to the preceding paragraphs. As a result, the overall visual impression of the motor vehicle can be produced much more cost-effectively compared to previously known star panels, but with at least the same visual appearance.

Further important features and advantages of the invention result from the dependent claims, the drawing and the associated FIGURE description made with reference to the drawing.

It is understood that the aforementioned features and the features still to be explained in the following can not only be used in the respectively specified combination, but also in other combinations or in isolation, without leaving the scope of the present invention.

A preferred exemplary embodiment of the invention is presented in the drawing and is explained in more detail in the following description.

BRIEF DESCRIPTION OF THE SOLE DRAWING FIGURE

The sole FIGURE shows a sectional view through a possible construction of a decorative composite material according to the invention.

DETAILED DESCRIPTION

The sole FIGURE illustrates a decorative composite material 1 according to the invention having a flat translucent decorative material 2, with a visible side 3 and a rear side 4 opposite the visible side 3. A light-impermeable layer 5 with recessed regions 6 is arranged on the rear side 4 of the decorative material 2. According to the invention, three-dimensional structures 7 protruding into the decorative material 2 as shown in the FIGURE are now arranged in the recessed regions 6, at least in parts thereof, on the rear side 4 of the decorative material 2. A chrome foil 8 is also arranged on the light-impermeable layer 5, which spans the recessed regions 6. The chrome foil 8 has a translucent PVD layer 9 and a diffuser layer 10 facing away from the decorative material 2.

Furthermore, the entire decorative composite material 1 can be illuminated or backlit via a lighting device 11.

The diffuser layer 10 can, for example, be applied onto the translucent PVD layer by means of screen printing. As a result, a cost-effective and extremely flexible application of the diffuser layer is possible.

The light-impermeable layer 5 can also be designed as a loading surface and, in particular, can be kept the same color as a motor vehicle 12 in which the decorative material composite 1 according to the invention is used.

The chrome foil 8 itself spans the recessed regions 6, but can also be deformed into them, for example by means of thermoforming, as a result of which the PVD layer 9 with its chrome surface protrudes into the cavities 6. It is conceivable that the PVD layer may only protrude partially into the cavities or may be applied completely onto a negative shape of the three-dimensional structures 7.

With the decorative composite material 1 according to the invention, it is no longer necessary to directly line three-dimensional ornament geometries (structures 7) in the decorative composite material 1 with a PVD coating or a deep-drawn chrome foil. A high-quality chrome look of the three-dimensional structures 7 can therefore be achieved with the invention because the chrome foil 8 is applied flat onto the light-impermeable layer 5, for example glued on. The "notched" three-dimensional structures 7 are merely spanned by the chrome foil 8, however do not have to be exactly reshaped by this. Despite this, they have a glossy chrome look on their side facing towards the decorative material 2, thereby creating the particularly visually appealing three-dimensional effect. However, it is not necessary to shape the chrome foil 8 using a high-precision process, such as an HPF method, for the spanning; instead, simple thermoforming or straight spanning is sufficient.

Due to the multi-layer structure of the chrome foil 8, it can simultaneously be used as a diffuser layer for the backlighting device 11. Furthermore, the decorative composite material 1 according to the invention has a comparatively low height in the X direction.

With the decorative composite material according to the invention, a chrome effect of three-dimensional structures 7, for example stars, can also be achieved without a subsequent and expensive PVD process, as well as an overall concept optimized for installation space for an illuminable decorative composite material 1 with homogeneously lit three-dimensional structures 7.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A decorative composite material comprising:
   a flat translucent decorative material with a visible side and a rear side opposite the visible side;
   a light-impermeable layer having recessed regions and arranged on the rear side of the flat translucent decorative material;
   three-dimensional structures arranged in the recessed regions on the rear side of the flat translucent decorative material; and
   a chrome foil, spanning the recessed regions, arranged on the light-impermeable layer, wherein the chrome foil has a translucent physical vapor deposition (PVD) layer and a diffuser layer facing away from the flat translucent decorative material.

2. The decorative composite material of claim 1, wherein the diffuser layer is screen printed.

3. The decorative composite material of claim 1, wherein the three-dimensional structures protrude into the flat translucent decorative material.

4. The decorative composite material of claim 1, wherein the light-impermeable layer is a paint film.

5. The decorative composite material of claim 1, wherein the chrome foil is deformed by thermoforming into the three-dimensional structures in the recessed regions.

6. The decorative composite material of claim 1, wherein the chrome foil is bonded directly to the rear side of the flat translucent decorative material, and the chrome foil is bonded to the rear side of the flat translucent decorative material exclusively in regions of the flat translucent decorative material that do not include the recessed regions.

7. The decorative composite material of claim 1, wherein the chrome foil further comprises a further diffuser layer facing towards the flat translucent decorative material.

8. A motor vehicle comprising:
a decorative composite material, which comprises
a flat translucent decorative material with a visible side and a rear side opposite the visible side;
a light-impermeable layer having recessed regions and arranged on the rear side of the flat translucent decorative material;
three-dimensional structures arranged in the recessed regions on the rear side of the flat translucent decorative material;
a chrome foil, spanning the recessed regions, arranged on the light-impermeable layer, wherein the chrome foil has a translucent physical vapor deposition (PVD) layer and a diffuser layer facing away from the flat translucent decorative material; and
a light configured to illuminate the decorative composite material.

9. The motor vehicle of claim 8, wherein the diffuser layer is screen printed.

10. The motor vehicle of claim 8, wherein the three-dimensional structures protrude into the flat translucent decorative material.

11. The motor vehicle of claim 8, wherein the light-impermeable layer is a paint film.

12. The motor vehicle of claim 8, wherein the chrome foil is deformed by thermoforming into the three-dimensional structures in the recessed regions.

13. The motor vehicle of claim 8, wherein the chrome foil is bonded directly to the rear side of the flat translucent decorative material, and the chrome foil is bonded to the rear side of the flat translucent decorative material exclusively in regions of the flat translucent decorative material that do not include the recessed regions.

14. The motor vehicle of claim 8, wherein the chrome foil further comprises a further diffuser layer facing towards the flat translucent decorative material.

\* \* \* \* \*